United States Patent [19]

Fahrner

[11] 4,023,518

[45] May 17, 1977

[54] DREDGE PIPE COUPLING SYSTEM

[76] Inventor: Willard F. Fahrner, 251 Florence St., SW., Aiken, S.C. 29801

[22] Filed: Jan. 20, 1976

[21] Appl. No.: 650,715

Related U.S. Application Data

[60] Continuation of Ser. No. 483,706, June 27, 1974, abandoned, which is a division of Ser. No. 302,543, Oct. 31, 1972, Pat. No. 3,820,258.

[52] U.S. Cl. .................................. 114/244; 37/72; 141/287; 141/388; 277/34.3; 285/97
[51] Int. Cl.² ..................... B63B 21/62; B67C 3/34
[58] Field of Search ............... 37/72; 285/97, 351; 141/387, 346, 388, 382, 279, 312, 287; 277/34.3, 34.6; 403/288; 114/235 A, 235 R; 138/93

[56] References Cited

UNITED STATES PATENTS

| | | | |
|---|---|---|---|
| 637,947 | 11/1899 | Rose | 37/72 X |
| 2,742,305 | 4/1956 | Converse et al. | 285/97 X |
| 3,199,553 | 8/1965 | Garrett et al. | 141/388 |
| 3,485,200 | 12/1969 | Iozza | 114/235 R |
| 3,514,115 | 5/1970 | Gallo | 277/34.3 |
| 3,581,782 | 6/1971 | Onufer | 141/287 X |
| 3,722,556 | 3/1973 | Jeffers et al. | 285/97 X |
| 3,746,060 | 7/1973 | Janssen et al. | 141/387 |
| 3,754,581 | 8/1973 | Taggart | 141/387 X |

FOREIGN PATENTS OR APPLICATIONS

| | | | |
|---|---|---|---|
| 1,371,303 | 7/1964 | France | 285/97 |
| 1,170,921 | 11/1969 | United Kingdom | 285/97 |

*Primary Examiner*—Clifford D. Crowder
*Attorney, Agent, or Firm*—Mason, Mason & Albright

[57] ABSTRACT

A system of subaqueous excavation and material removal having the combination of a hopper dredging vessel, hopper barges with independent dumping capacity and a prime mover vessel such as a tug, each barge having a stern notch and a bow portion which is contoured to be received in a like stern notch of an adjacent barge so that two or more barges can be arranged and affixed into an assemblage, end-to-end with bow portions fitting into the stern notches. Conduits to carry dredged material are located on the stern and bow of each barge and bow of the dredging vessel. The outlet conduit is received by the inlet conduit when the bow of the vessel or barge is received in the stern notch of the barge. The diameter of the outlet is about two feet less than the diameter of the inlet to minimize the possibility of the outlet not being received in the inlet due to a slight misalignment of the vessels. For providing a tight connection of the conduits when the barge and dredging vessel or barges are secured together as aforesaid, each unit has a tubular outlet extending proximate the bow portion which is received in a larger tubular inlet extending proximate the stern notch, there being an arrangement of annular members about the engaging conduit members which are expansible through air under pressure delivered by pneumatic lines from air pressure sources preferably on the dredging vessel and which securely connect the conduits together whereby dredged material may be delivered from the dredging vessel simultaneously to each of the barges in the assemblage. The connection of the units is accomplished without any rigid structural linkage over a relatively broad and large surface area whereby unwanted redundancy of strength at the connection is largely eliminated.

12 Claims, 16 Drawing Figures

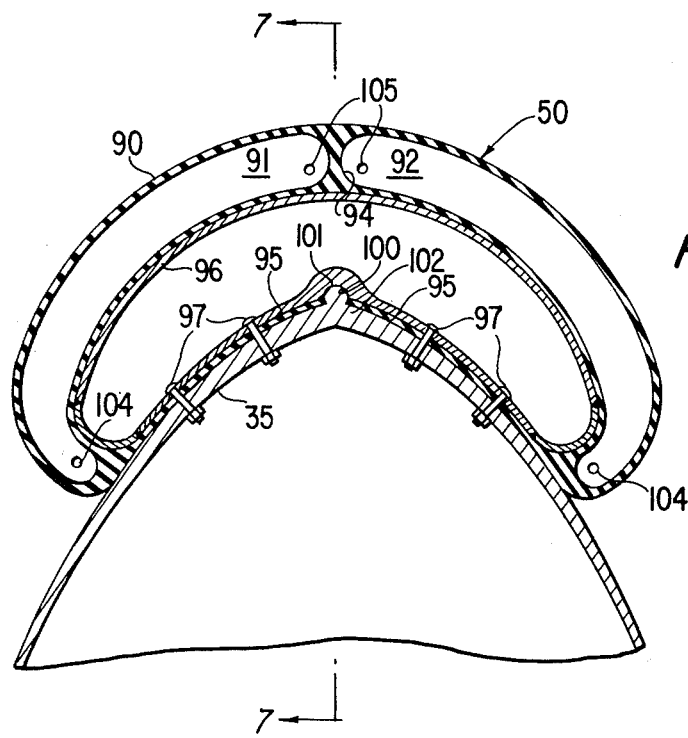
FIG. 8
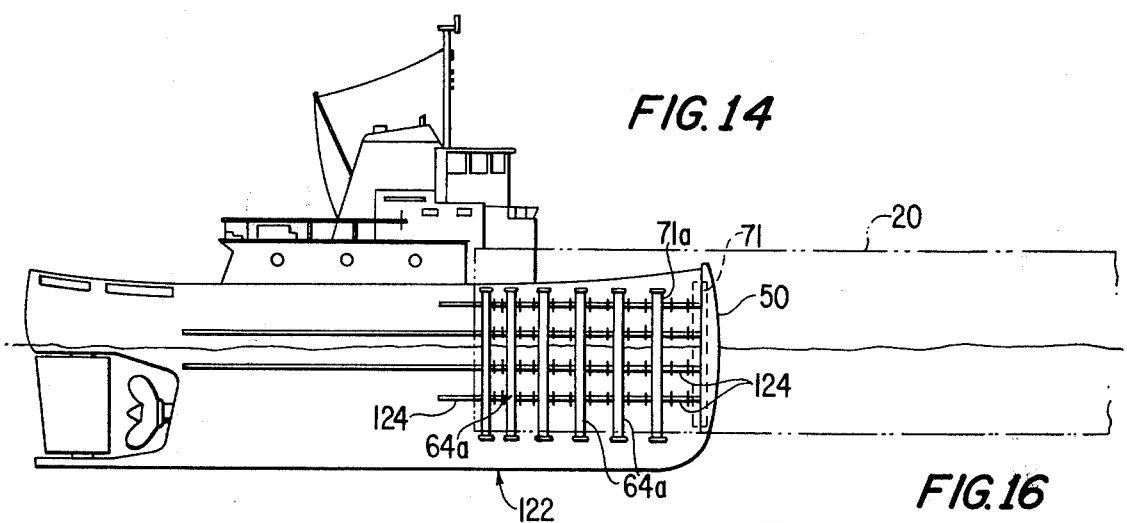
FIG. 14
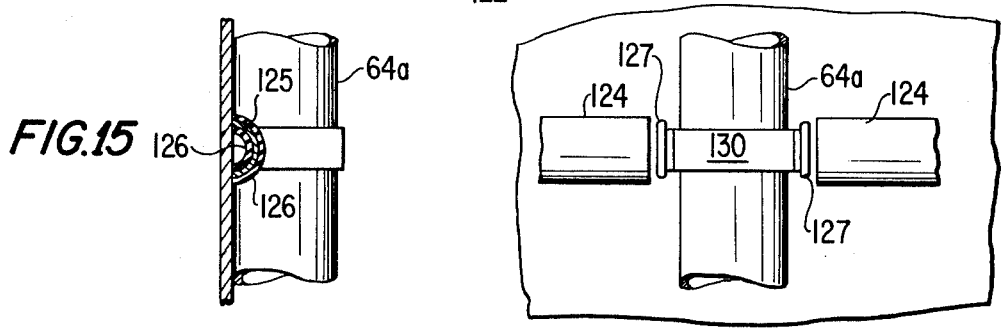
FIG. 15
FIG. 16

DREDGE PIPE COUPLING SYSTEM

RELATED APPLICATION

This is a continuation of application Ser. No. 483,706 filed on June 27, 1974, now abandoned, which is a divisional application of application Ser. No. 302,543 filed Oct. 31, 1972, now U.S. Pat. No. 3,820,258.

BACKGROUND OF THE INVENTION

The invention relates to an efficient dredging system wherein continuous subaqueous excavation is maintained by delivering dredged material continuously to an assemblage of hopper barges connected together and to the dredging vessel in an assemblage through a system of pneumatic fenders acting on bow portions received in stern notches, the securing being effected by the pneumatic pressure applied by the fenders against the side hulls of the bow portions of the barges and dredging vessel. By removing the barges as an assemblage and quickly replacing same with a further assemblage of barges the dredging operation may continue without interruption. A prime mover having a bow portion similar to that of the dredging vessel may be utilized to push the detached barge assembly out to sea or otherwise where it may be dumped and thereafter to return the assemblage to the dredging vessel for replacing a like barge assemblage which has been filled with dredging material in the meanwhile.

The function of the contemporary hopper dredge is dredging, which is an underwater, subaqueous type excavation. The primary modes of operation of contemporary hopper dredging vessels are as follows:

1. Agitation Dredging — The dredge spoils are allowed to overflow from the vessel's hoppers during the dredging operation. As a result, the vessel's hoppers need only be dumped at infrequent intervals. Unless the dredged material which overflows is carried away by the current, much and perhaps most of the overflow dredged material eventually is redeposited in the dredging project prism.

2. Side Casting — In this mode of operation the dredging vessel continually discharges dredged material directly via an extended conduit to an immediately adjacent disposal area. As a practical matter, this mode requires that the disposal area be within about two hundred feet of the channel being dredged and parallel to such channel with a dike or the like isolating the disposal area from the dredging project prism.

3. Boom Dredging — In this mode, the hopper dredge is located relatively near the disposal area but not sufficiently near to utilize the side casting mode. The hopper dredge proceeds to such disposal area whenever an economical load has been obtained in the dredge's hoppers and the dredged material is dumped in that portion of the disposal area nearest the point at which the hopper dredge left the dredging project. After such dumping, the hopper dredge resumes dredging at the point it previously left.

4. Dredging and Hauling — In this mode, the disposal area is located at a substantial distance from the site being dredged. Each dredged load must therefore be hauled to the disposal area and dumped or otherwise discharged before the hopper dredge can return for another load. The disposal area may be relatively remote: that is three to sixty miles from the dredging site.

To accomplish the latter mode, Dredging and Hauling, and also the mode, Boom Dredging, the hopper dredge actually forms three separate functions which are: (1) The subaqueous excavation within the project prism: (2) The retention of solids and slurry or both which have been removed from the project prism, and (3) The transport and final disposition of the dredged and retained solids or slurry, together with return to the dredging site.

The contemporary hopper dredge is a unique self-propelled, seagoing ship which is physically designed, constructed and operated to perform all three of the above-mentioned functions. It will be appreciated that the hopper capacity limitations of the dredge requires that these functions be performed in the sequence given. It has been found that for a typical 3,000 cubic yard hopper capacity trailing section hopper dredge wherein the dredging project is located approximately 6 miles from the sea-dump disposal site, the ratio between dredging and retention activity and transport and disposal activity is approximately one to two. Accordingly, if a hopper dredge of such type dredges say 8,500,000 cubic yards in 300 operating days and the vessel's operating cost, excluding repairs, during such period is about $3,000,000, about $1,000,000 is applied to dredging and retention activities and about $2,000,000 to disposal activity.

Under the same conditions, except that the sea dump disposal site is located 30 miles from the dredging site, the ratio between the dredging and retention activity on one hand and the transport and disposal activity on the other, is about 1 to 9.

At present, due to increased interest in geological and ecological considerations, there is a trend leading to a substantial increase in distance between the dredging activity and the disposal dump and an increased use of the dredging and hauling mode of operations. The alternative is to provide specialized disposal facilities for the direct or indirect discharge of dredging materials at shoreside establishments on each project. In either event, the expenditures for the dredging and disposal operations are greatly increased.

In face of the increasing costs, an expansion of dredging operations is and will be for some time required for commerce and traffic in the various harbors and inland waterways of this country. This is particularly so due to the substantial increases in draft and capacity of merchant vessels which has taken place in the last several years.

Although a growing awareness concerning marine and shoreside ecological considerations has served to emphasize the economical problems of present hopper dredger operations, the fact is that a need has long existed for a system which is substantially more efficient than that used at present from the standpoint of productivity in the excavation and disposal of the dredged material.

SUMMARY OF THE INVENTION

It has occurred to the inventor that the construction and utilization of modulized or unitized separate specialized units might prove advantageous for all modes of hopper dredge type operations. In this connection, it is known that for some time, a system of marine transportation has existed on rivers and inlet waterways wherein a tug boat moves a barge to and from an unloading area and barges may be connected by the tub boat in various configurations for either pushing or towing operations. More recently, a more or less similar system has been used for ocean going barges, usually with a single barge, designed for that purpose. However, as is well known by experienced mariners, there is a vast difference between operations in the inland waterways and harbors, and operations at sea. Inasmuch as the hopper dredge is at times required to dredge or travel in areas which are essentially open sea or, in any event, areas subject to effects of winds and tides together with relatively high waves, and must load and unload under such conditions, the problems involved are distinctive from both inland and sea-going cargo carrying and handling operations. Nevertheless, it has occurred to the inventor that with appropriate means of rapidly and effectively linking several units in a system comprising a dredging unit, a plurality of barge units, and a prime mover or tug unit, a practicable solution for cutting costs of dredging operation may be realized. In fact, the savings in certain typical operations exceed fifty percent.

The function of the dredging unit or vessel in accordance with the invention is to remove hydraulically the dredged material, known as spoils in the art, from the bottom being dredged, and at the same time, retain a barge assemblage made up of one or more barge units (which serves functions for the retention, transport and disposal of the spoils) in a desired position in the waterway, and to convey the spoils into the detachable repository constituted by the barge assemblage. The function of the barge assemblage is a detachable repository to receive the dredged material, and, when detached from the dredging unit, to serve in effect as a mud scow either in the assemblage form or as individual units which can be towed or pushed to distant disposal areas, dumped and brought back to the project anchorage wherein they may be linked up in assemblages of two, three or more barges again to constitute the appropriate hopper section or repository for spoils from the dredging vessel. The third unit required is the prime mover which can be an ordinary tug boat or a vessel specially designed for this operation.

An important aspect of this invention comprises the "link-up" of the dredging unit with the barge unit assemblages. The term "link-up" is utilized herein to mean the integration of separate units so that the separate hulls may be maneuvered and secured together so that their compatible piping and conduit systems are functionally connected. Thus, the link-up of the dredging unit with the barge unit assemblage forms a further assemblage which is essentially a complete hopper dredge. However, when such hopper assemblage has been filled as a result of dredging cuts over the project, the barge assemblage is detached or otherwise unlinked and anchored or otherwise removed and the dredging vessel links up as before with another assemblage of barge units to resume the dredging cutting as before until this second barge assemblage has also been filled whereupon another exchange takes place. In the meantime, the filled barge unit assemblage is towed or preferably pushed by a prime mover designed for this purpose to disposal area, dumped and then returned to the project to again be linked up with the dredge vessel. It will be appreciated that when operating under reasonable sea conditions, the prime mover or tug may move two or more of the barge units as an assemblage or two assemblages connected together, but under adverse conditions this may not be advisable. Linked-up barges should be dumped simultaneously.

From environmental and ecological standpoints, the barge units and assemblages in accordance with the invention present many advantages. In this connection, it should be appreciated that spoils which have been dredged from underwater may vary considerably in content from clean sand to mud to a sludge or tar-like substance which may be contaminated by sewerage, industrial waste and the like. Such spoils, however, have potential value due to their content to industry and construction as well as to agriculture. Sea dumps and waterways now being used for dumping must, of necessity, soon be greatly curtailed and I anticipate that disposal facilities will take their place which are suitable for floating crafts such as assemblages and barge units in accordance with the invention. Shoreside plants and facilities which are profitable, at least to the extent that they can provide savings over other alternatives, can then be established on a temporary or permanent basis for recovery and processing of spoils in such enclosures or areas. The barge units of this invention may be advantageously conveyed through a waterway in such an enclosure, formed by, say, a series of three locks, with the middle lock comprising the spoils disposal enclosure from which permanent and fixed means for transportation of the spoils to a shoreside facility may be easily installed or incorporated. Thus, it is considered that barge units in accordance with the invention can be utilized in such a spoils disposal activity more easily and economically than would exit for a powered vessel inasmuch as automatic means may be utilized to carry the loaded and empty barges through the facility on essentially an assembly line basis.

In a situation where it is desired to dispose of clean sand spoils for replenishment of a beach, it will also be understood by those skilled in the art that barge units which conform to the disclosure herein may be utilized advantageously for this purpose.

Although it will be recognized that for the first time a sectional or unitized concept is applied in my invention to major units in the dredging industry, existing and known types of dredges, barges and the like are not adaptable in an efficient manner to the system of the invention unless substantially modified. Thus, it is important to understand that a completely new and novel system and means for linking up the various units and for effecting their disconnection is presented hereby for connecting the specially designed barge units together and the assemblage thereof to the unique dredging vessel. A bow end received in a stern notch is provided wherein the stern notch includes a plurality of vertically disposed pneumatically and inflatable members which, when the bow end is received in the stern notch may be quickly inflated to effect a strong frictional grip over a broad area of the hull portion effectively linking the units together. The link-up is facilitated by means of an inflatable fender couple on the stem of the bow portion received between a pair of inflated tubular fender members on either side of the interior apex of the stern notch. With receipt of such inflatable fender couple between the two vertically disposed tubular members, an outlet portion for the conduit for conveying dredging material is received within an inlet tube on the barge unit and a special arrangement of annular inflatable members between the inlet and outlet conduits are inflated to effect a connection and substantially water-tight seal between such conduit portions. Subsequently, if and when necessary, the inflatable fender couple may be momentarily eased by partial deflation to facilitate limited adjustments which may be required by dissimilarities in the draft or trim of the vessel and barge unit. By doing so, the vessel and barge units are appropriately adjusted to float at the draft and trim imposed by their loaded condition, and the adjustment is desirable to ease stress at the individual couples and adjacent structures. In this connection, one foot of tolerance is provided in the conduit connections to permit such limited adjustments.

With the dredging vessel connected to the barge assemblage, and the dredging material conduit from the dredging vessel connected to barge conduits, also connected, on the barge assemblage, the dredged material is conveyed from dredge pumps through the dredge material conduit to the barge units of an assemblage and through tainter gates. As the barge units fill and sink lower in the water, the dredging vessel is trimmed in an appropriate manner so as to prevent the application of undesired stress on the pneumatic apparatus which has effected the link-up. Subsequently, when the barge assemblage units are filled with spoils, the assemblage is quickly disconnected by deflating the various members which previously effected the pneumatic link-up and such linkage is thus effectively and rapidly disestablished.

A fuller understanding of the adaptabilities and capabilities of the invention will be had by those skilled in the art as the description progresses and with reference to the accompanying drawings which illustrate schematically and by way of example a system embodying the invention.

BRIEF DESCRIPTION OF THE DRAWINGS

FIG. 8 is a cross-sectional view of a stem fender shown in FIG. 7;

FIG. 14 is an elevational view of a prime mover vessel in accordance with the invention;

FIG. 15 is a fragmentary side view in partial section of a fender piece attached to the vessel shown in FIG. 14; and FIG. 16 is a fragmentary elevational view of the fender of FIG. 15.

DESCRIPTION OF THE PREFERRED EMBODIMENT

Figure 1:
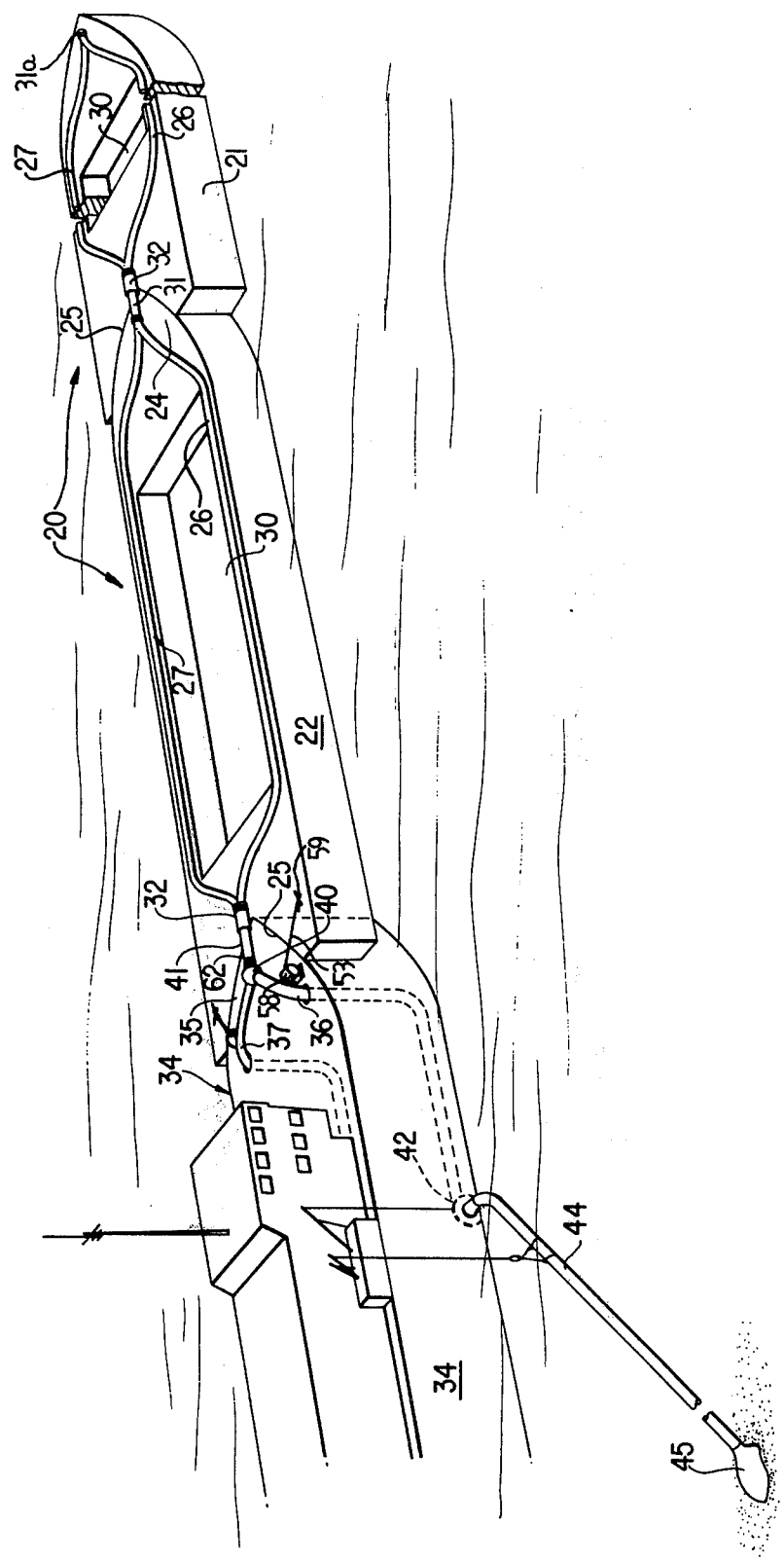
FIG. 1 is a perspective view showing an assemblage of two barge units and a dredging vessel in accordance with the invention.

Referring to FIG. 1, a barge assemblage designated generally by reference numeral 20 comprises a retention, transport and disposal modular, barge unit 21 and a similar barge unit 22. Each barge unit has starboard and port dredging material conduits 26 and 27 respectively. The conduits 26 and 27 circumvent the opening for hopper space 30 and combine forward where conduits 26 and 27 join in a dredging material conduit outlet portion 31 which is received by a dredging material conduit inlet portion 32. Dredging material conduit outlet portion 31a in the bow portion of barge unit 21 is secured by a valve or other appropriate means unless received by the inlet portion 32 of a further barge unit, it being necessary that the foremost outlet portion of the dredging material conduit be closed during leading operations.

The dredging vessel 34 includes a boe portion 35 which is similar in contour and structure to bow portions 24 of barge units 21 and 22. Dredging vessel conduits 36 and 37 on the starboard and port respectively join at a dredge pump discharge distribution chamber 40, forward from which extends a dredging material conduit outlet portion 41 which is similar to outlet portions 31 of barge units 21 and 22. Conduits 36 and 37 extend into the interior of the vessel 34 to the discharge of port and starboard dredging pumps 42 which take their suction through drag arms 44 that terminate in suction ends or drag heads 45. The hopper dredge assembly of drag heads, drag arms and suction pipes, dredge pumps, and the discharge piping from the dredging pumps are well known in the art and will not be described in detail herein.

Figure 2:
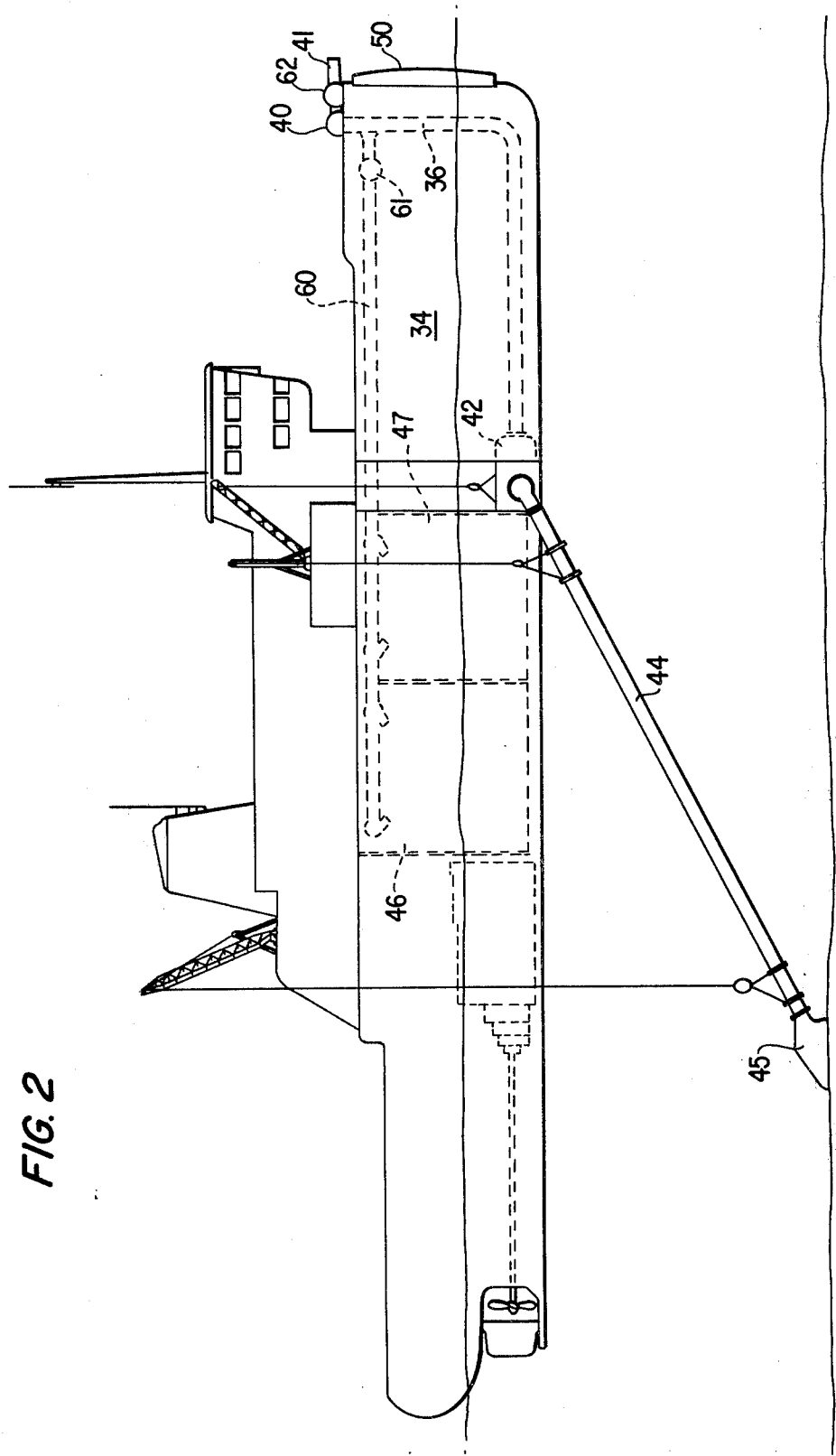
FIG. 2 is a side elevation of a dredging vessel in accordance with the invention.

With reference to FIG. 2, it will be noted that the dredging vessel 34 includes trimming tanks or hoppers 46 and 47. Connection of the dredging vessel 34 and the barge unit 22 and the latter unit with barge unit 21 is obtained through cooperating arrangements of pneumatically expansible means comprising a stem fender assembly 50 and a plurality of associated fender pieces 71 and 64. Thus an element of the cushioning fender couple between vessel 34 and barge units 21 and 22 comprises a stem fender assembly 50 which is connected to the stem of vessel 34 in a fashion which will be described in more detail hereinafter.

As may be seen in FIGS. 3 and 4, an air compressor 51 connects to a discharge air line 52 which selectively connects through a plurality of valves to a fender pieces 71 and 64 connected to the stern notch sides as will be described hereinafter. A further air compressor 54 delivers compressed air through a conduit 55 to stem fender assembly 50. A hydraulic pump 56 connects through hydraulic line 57 to various tainter gates which are contained in conduits 26 and 27 for controlling the flow of dredging material into the hopper spaces 30 of barge units 21 and 22.

Figure 3:
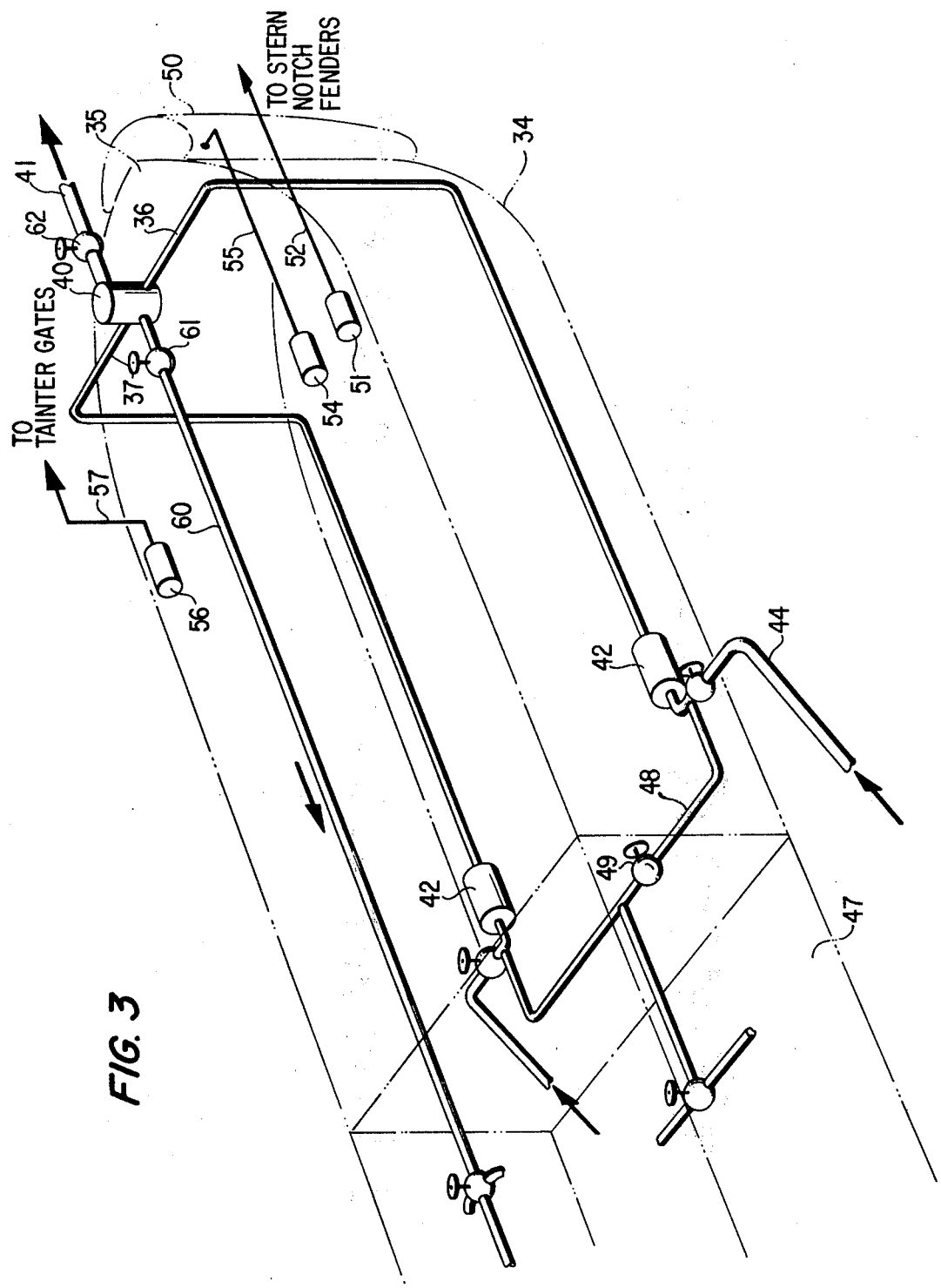
FIG. 3 is a schematic representation of the bow portion of the dredging vessel shown in FIG. 2.

As shown in FIGS. 2 and 3, a return line 60 serves to return dredging material with the accompanying water to trimming tanks 46 and 47. For the purpose of controlling flow from distribution chamber 40, a gate valve 61 is provided in return line 60 and a further gate valve 62 is provided between the distribution chamber 40 and outlet portion 41. A suction line 48, including a valve 49, connects the bottom of tanks 47 with the suction of the starboard dredging pump 42. A similar line, not shown, connects the lower part of tanks 46 with the suction of port dredging pump 42.

Figure 4:
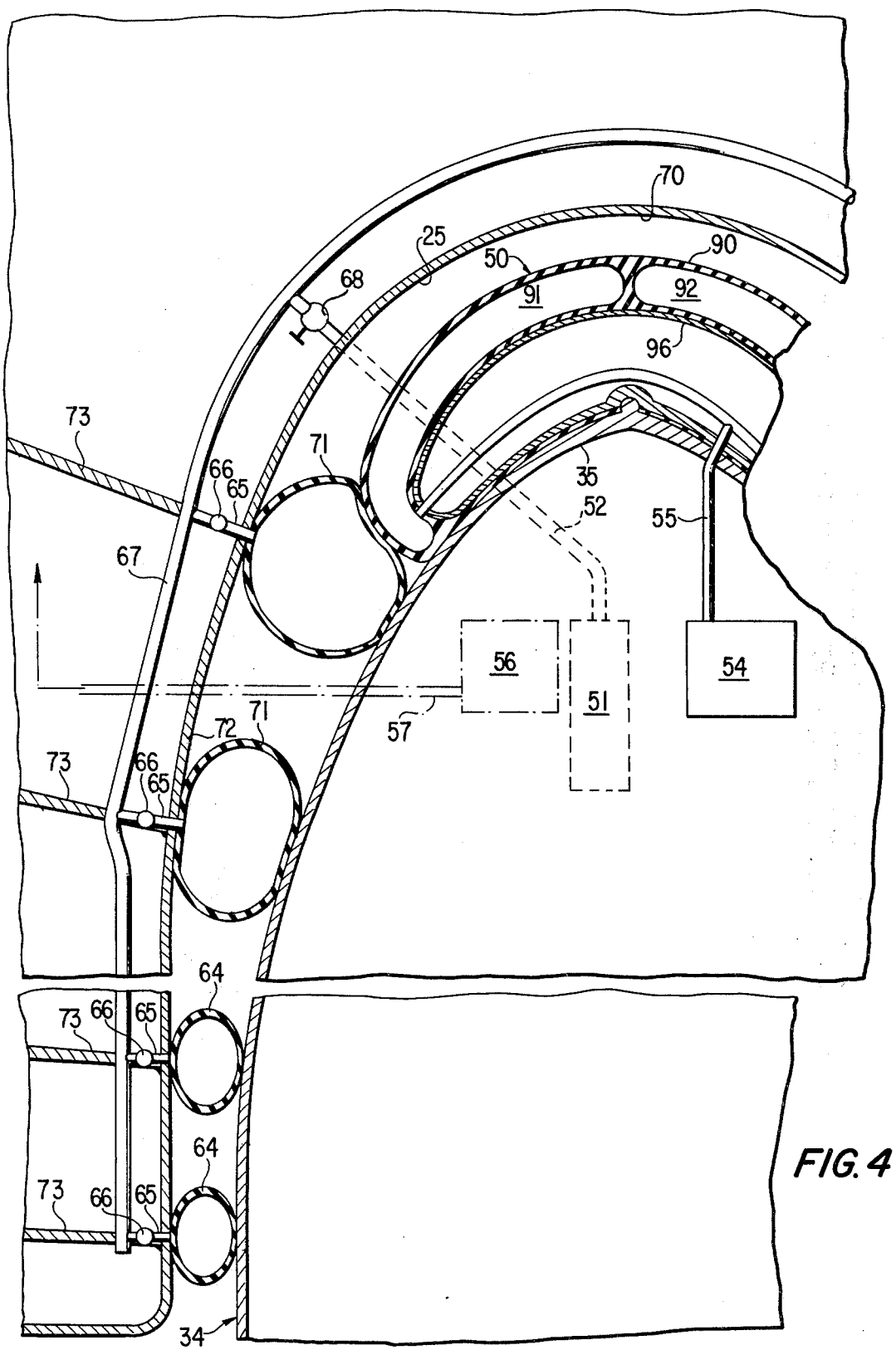
FIG. 4 is a plan view of the bow portion of the dredging vessel received in the stern notch of a barge unit in accordance with the invention.

Referring to FIG. 4, it will be noted that the stern notch 25 includes a plurality of stern notch fender pieces 64 each of which is connected through an air branch line 65 having a control valve 66 to an air manifold line 67 which is connectable to air conduit 52 via valve 68. Near the apex, designated by reference numeral 70, of stern notch 25 a pair of apex stern notch fender pieces 71 are secured to the sides of the stern notch 25. Such fender pieces 71 are similar to fender pieces 64 except that the diameter of the apex fender pieces 71 is about double that of fender pieces 64. However, apex fender pieces 71 are also connected through air branch lines 65 to air branch manifold line 67, control valves 66 being located in lines 65.

It will be noted that the interior hull portion of stern notch 25 designated 72 has frames 73 welded thereto and extending normally therefrom behind each of the fender pieces 64 and 71.

Figure 5:
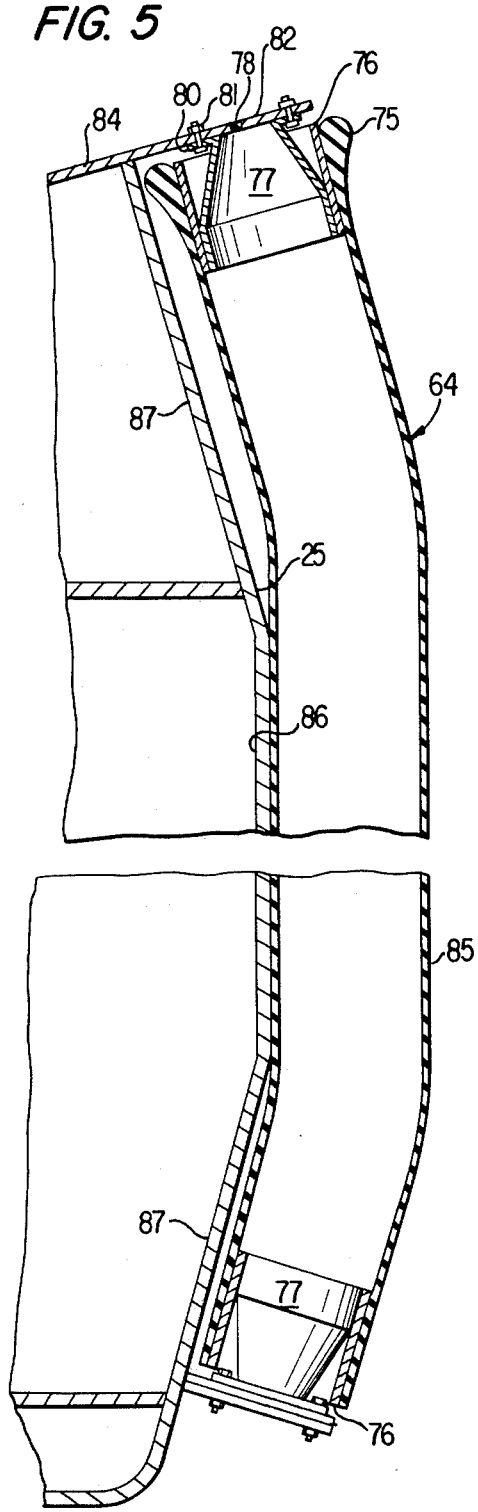
FIG. 5 is a sectional side view of a vertically disposed fender tube connected to the sides of the stern notch.
Figure 6:
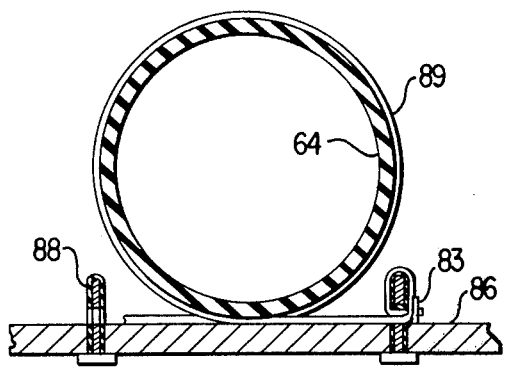
FIG. 6 is a top sectional view of the vertically tubular member shown in FIG. 5 illustrating means for securing same to the vertically disposed face of the stern notch.

Referring to the detailed drawing shown in FIG. 5, each fender piece 64 is composed of a rubber-like material and comprises a carcass portion 75 which is rigidly connected to a steel tubular member 76. A steel reducer insert 77 is welded to tubular member 76 and also to the reducer flange 80 which is connected through flange bolts 81 to an apron flange 82 which extends from the staging surface or deck 84 of the barge unit. Deck 84 has threaded opening 78 leading into the interior of the fender piece 64 for receiving an air branch line 65. A flexible tubular portion 85 extends downwardly from carcass 75 to a similar connection in the lower portion of the barge unit. In dimensions, the fender piece 64 is about twelve to fourteen inches in diameter and extends about four feet above and below the molded vertical sides 86 of the stern notch 25. The apron flange 82 is inclined about fifteen degrees inboard and surmounts the molded stern notch. The inclined sides of the stern notch are designated by reference numeral 87. It will be appreciated as important that non-resilient structure within the stern notch 25 be absent from the vertical side 86 thereof except close to side 86 as, for example, used to secure fender piece 64 as shown in FIG. 6. Here, a pair of guides 88 are connected to and extend normally from side 86. A nylon strap 89 snuggly surrounds fender piece 64 and is secured through openings in guides 88 by retention staples 83 to guides 88. Guides 88 are preferably coated with a resilient rubber or rubber-like material.

Figure 7:
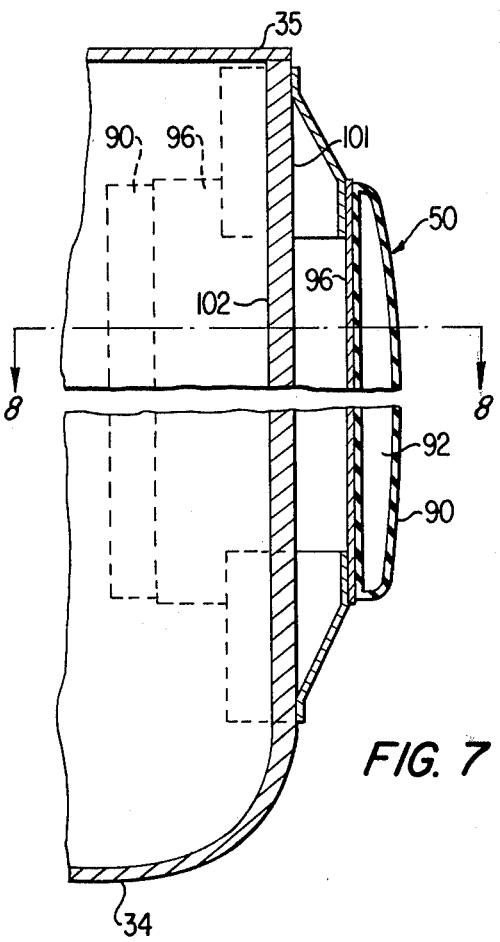
FIG. 7 is a side sectional view of the stem fender assembly attached to the stem of the dredging vessel.

As shown in FIGS. 7 and 8, the stem fender assembly 50 comprises a resilient portion 90 which is preferably constructed of a six ply automotive type carcass and encloses separate expansible chambers 91 and 92, the port chamber 91 being divided from the starboard chamber 92 by a vertically oriented center wall 94. Lateral projections 95 are connected to a roughly cardioid configured steel portion 96 of fender assembly 50 by means of bolts 97 which extend from bow portion 35. A notch 100 formed at a central location in steel portion 96 is shaped to receive an interlock 101 which extends forwardly from the stem 102 of the dredging vessel's bow portion 35. Steel portion 96 is joined to bow portion 35 by the vertically lowering the stem fender assembly 50 so that notch 100 receives and firmly engages interlock 101. Each chamber 91 and 92 connects with an air pressure inflation valve 104 and a deflation valve constituting an air pressure bleeder 105.

As shown in FIG. 4, the stem fender assembly 50 is, when inflated, adapted to be received between the innermost apex fender pieces 71 in an interlocking engagement. It will be appreciated that each bow portion 24 of the barge units 21 and 22 has a stem fender assembly 50 as well as the fender pieces 64, 71 and other related apparatus to effect the same necessary interlocking engagement.

Figure 9:
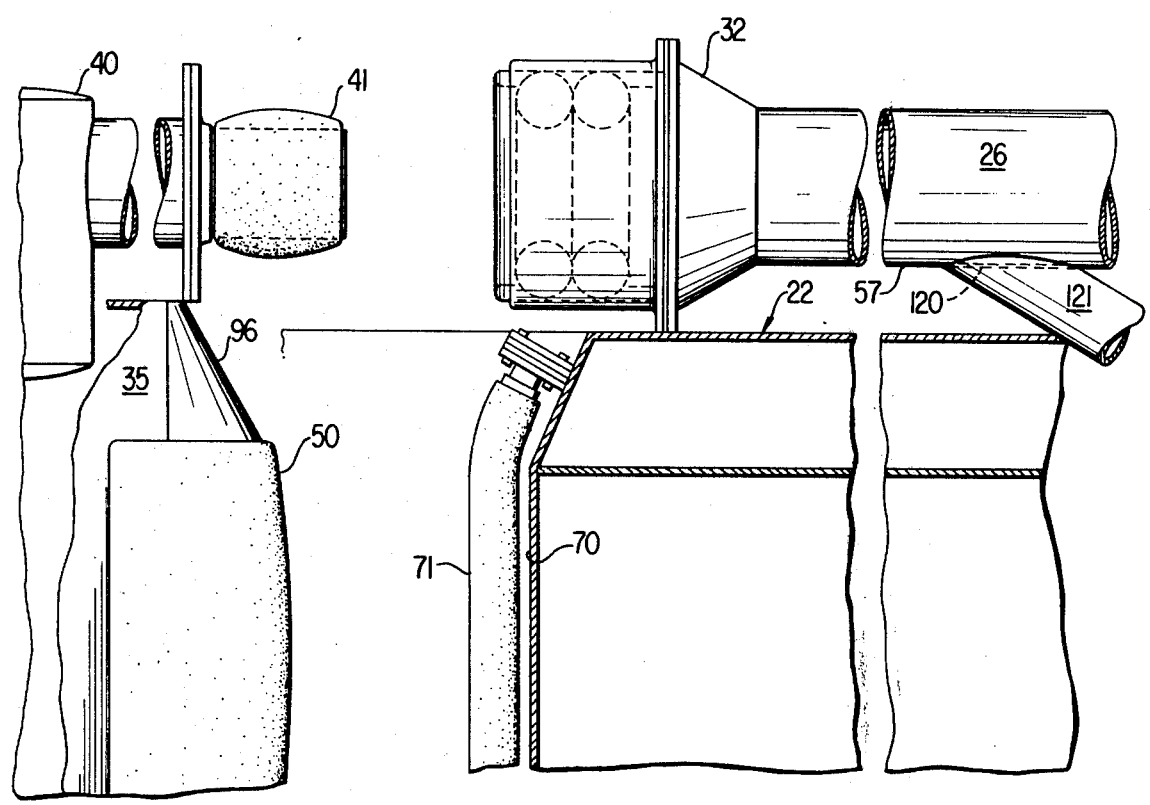
FIG. 9 is a side view illustrating the relationship of the stem fender and dredging material conduit outlet of the dredging vessel with the corresponding dredging material conduit inlet of the barge unit and stern notch fender piece before same are joined.
Figure 10:
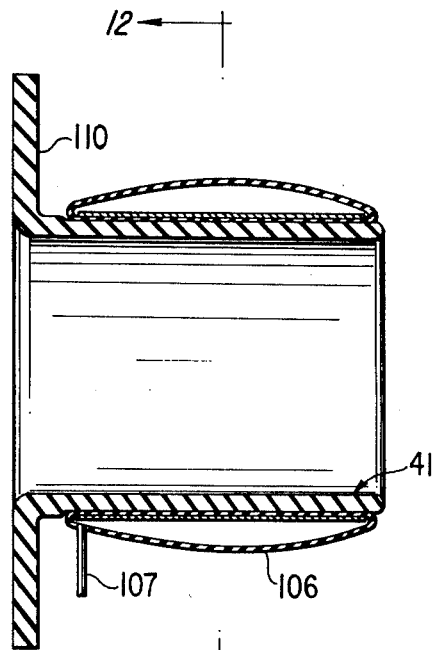
FIG. 10 is a detailed cross-sectional view of the dredging material conduit outlet shown in FIG. 9.

As shown in FIG. 9, proximate stem fender 50 and disposed above same is the dredging material conduit outlet portion 41 whereas proximate to the apex 70 of stern notch 25 and disposed above same is the dredging material conduit inlet portion 32 which leads and connects to conduits 26 and 27. It will be noted that the diameter of inlet portion 32 is substantially greater than the diameter of outlet portion 41. The measurement of the former relative to the latter being about 64 to 34 inches, or a ratio of about 2 to 1. Disposed about outlet portion 41 and connected thereto is pneumatic responsive means comprising an elongated expansible tubular member 106, a pressurized air supply 107 being connected to the tubular member 106 for selectively introducing or withdrawing compressed air from tubular member 106. Preferably tubular member 106 is composed of a rubber material and has a wall which is, in the center portion, about ¼ inch thick and diverges in width to about ½ inch at the edges. The outlet portion 41, to which tubular member 106 is connected, preferably is composed of a rigidly reinforced hose carcass with the interior coated with an abrasion resistant type rubber. A flange 110 is provided to limit entry of outlet portion 41 into the inlet portion 32. Outlet portions 31 of barge units 21 and 22 are constructed in the same manner as outlet portion 41 described above.

Figure 11:
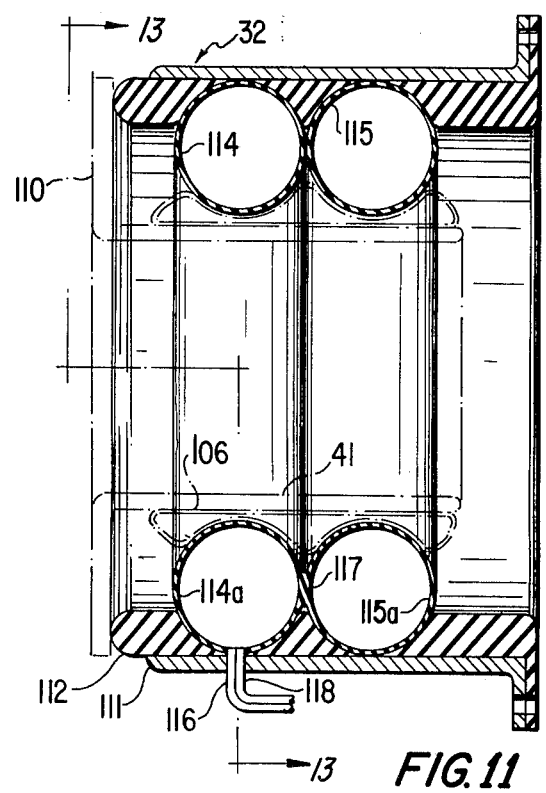
FIG. 11 is a cross-sectional view of the dredging material inlet shown in FIG. 9.

As will be noted with reference to FIG. 11, the inlet portion 32 comprises a steel tubular member 111 having a rubber lining 112 connected to its interior bore which is intended to receive a further pneumatic responsive means comprising a pair of tubular members 114 and 115 having a circular cross-section. Members 114 and 115 are expansible through means of an air conduit 116 which serves to introduce pressurized air within member 114. Air may be exhausted through conduit 118. A similar air conduit is provided for the tubular member 115. Tubular members 114 and 115 may be separate annular configured members as shown in cross-section of upper portion of FIG. 11; or they may have a common interior wall 117 as shown, to illustrate an alternative structure, for tubular members 114a and 115a in the lower portion of FIG. 11.

Figure 12:
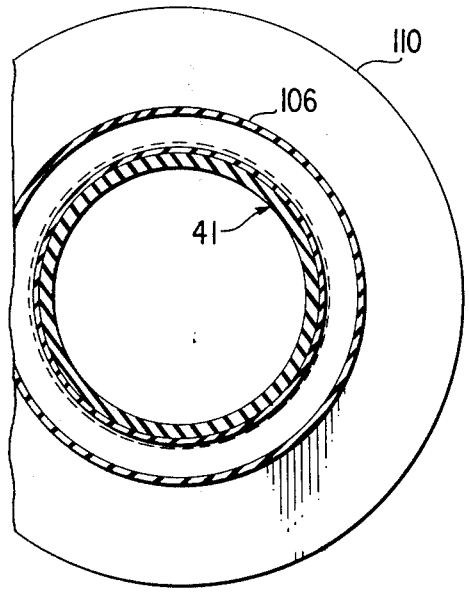
FIG. 12 is a front sectional view of the dredging material conduit outlet as shown in FIGS. 9 and 10.
Figure 13:
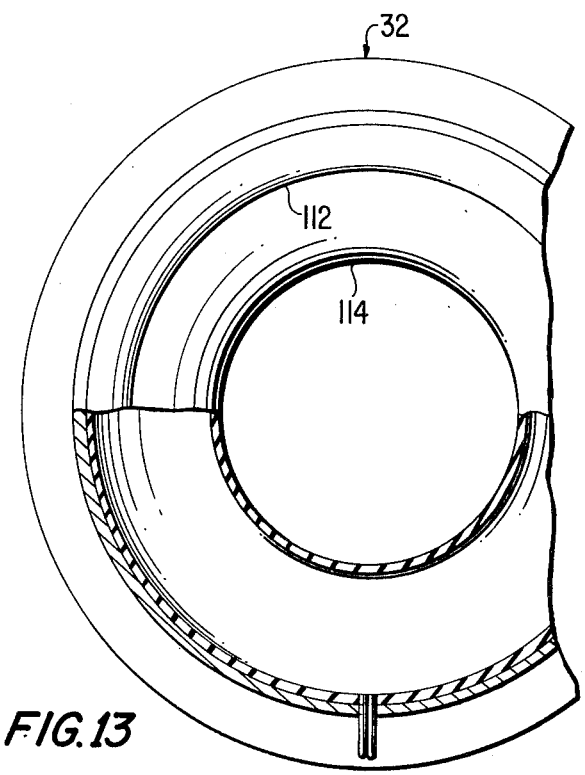
FIG. 13 is a similar view of the dredging material conduit inlet shown in FIGS. 9 and 11.

FIGS. 12 and 13 show the comparative size of the outlet portion 41 with tubular member 106 completely expanded and the inlet portion 32 with tubular members 114 and 115 expanded inwardly. It will thus be appreciated that engagement of an expanded tubular member 106 against tubular members 114 and 115 provides a substantially water-tight connection between the outlet portion 41 and inlet portion 32.

As shown in FIG. 9, the dredging material conduit 27 includes a tainter gate 120 whereby distribution to the hopper spaces 30 of barge units 21 and 22 via a hopper distribution conduit 121 is facilitated. It will be understood that a tainter gate 120 together with an associated conduit 121 is provided for each hopper space.

Tainter gates 120 are governed through the hydraulic line 57 and hydraulic controls, not shown — such apparatus being well known in the dredging apparatus and machinery art.

Conduit 52 to supply compressed air to fender pieces 64 and 71 and hydraulic line 57 are connected manually from barge unit to barge unit. Conduit 52 is preferably mounted on either conduit 26 or 27 or both when carried across the barge units. The same is true of the hydraulic line 57 which controls the tainter gates 120.

FIG. 14 illustrates a prime mover vessel 122 which has secured thereto in its bow area, in addition to the stem fender assembly 50, bow portion fender pieces 64a and a forward fender piece 71a which are similar in structure to stern notch fender piece 64 and apex fender pieces 71 except that they are secured to the bow portion of vessel 122 rather than the stern notch. Assemblage 20 is indicated in dot-dash lines together with the apex fender pieces 71 which engage the stem fender assembly 50 as previously described. The fender pieces 64a and 71a engage the sides of a stern notch such as stern notch 25 which, however, does not include fender pieces 64 and outboard apex fender pieces 71.

A plurality of spaced substantially horizontal strakes or bumper members 124 extend between the individual fenders 64a and 71a and between the fender 71 and the stem fender assembly 50 as shown in FIG. 14. Each bumper member 124 comprises a steel core member 125 which has a coating on each side of a rubber-type material 126. On either side of each fender piece 64a and 71a, a plurality of lugs 127 extend which receive and secure nylon straps 130 which snugly encircle fender pieces 64a to hold same in their desired lateral position in a manner similar to the construction disclosed relative to FIG. 6 for fender pieces 64 and 71. The horizontal bumper member 124 serves a double purpose of acting as guards for lugs 127 and, should the need arise, as part of the energy absorbing structure in the event that the fenders 64a and 71a are subjected to a substantial localized force through engagement with another vessel or object.

In operation, a dredging vessel 34 maneuvers its bow portion 35 into the stern notch 25 of an assemblage of barge units 20. This may be assisted by means of lines or straps 53 from winch 58 on vessel 34 connected to bits 59 on the barge unit 22. With compressors 51 and 54 in operation, stem fender 50 is brought into the apex 70 of stern notch 25. With stem fender 50 located at apex 70 between the inboard fender pieces 71, the resilient portion 90 of stem fender 50 is expanded by opening an appropriate valve in line 55 and at about the same time, the conduit 52 having been connected to manifold 67, fender pieces 64 and 71 are inflated preferably in sequence on both the starboard and port sides from forward working aft. Upon full inflation of fender pieces 64 and 71 and stem fender 50 the fender pieces 64 and 71 frictionally secure the hull of bow portion 35 within stern notch 25.

As stem fender 50 is brought into apex 70 of stern notch 25, outlet 41 is simultaneously brought into inlet 32, the vessel 34 previously having its draft adjusted to the proper draft for such insertion by means of trimming tanks 46 and 47. Due to the fact that the dredging vessel 34 and the barge assemblage 20 (including the barge units 21 and 22) when being made up and while being loaded float at approximately the same draft, the alignment and mating of outlet portion 41 with inlet portion 32 is a practicable expedient in normal seaways. In order to minimize possible misalignment, the inlet portion of 32 has a tolerance of about twelve inches in any direction from center relative to outlet portion 41.

As soon as the outlet portion 41 is received in inlet portion 32, tubular member 106 is expanded via air supply conduit 107 which is interconnected to conduit 55. At about the same time, tubular members 114 and 115 are also expanded to surround and engage tubular member 106 and provide a substantially watertight connection between the outlet 41 and inlet 32. When this connection is made, assuming that the assemlage 20 has already been made up, dredging operations are ready to commence. If assemblage 20 is not yet made up, the bow section 24 of barge unit 22 is then secured into stern notch 25 of the adjacent barge unit 21 in the same manner as described and this is also true of the outlet portions 31 and inlet portions 32 of the connecting barge units. Additional barge units may be also attached. However, as previously indicated, the last outlet 31a must necessarily be secured.

During the dredging vessel and barge units' connecting procedures, gate valve 62 remains closed and, if dredging operations are continued during such procedure, gate valve 61 is opened and dredging material is conveyed to tanks 46 and 47. After the connections between the dredging vessel 34 and the barge assembly 20, including the barge units 21 and 22, have been made, gate valve 62 is opened and gate valve 61 is closed whereupon dredging material is received through conduits 26 and 27 into both units 21 and 22 and is delivered to the hopper spaces 30 via the hopper distribution conduits 121 and tainter gates 120 controlled through hydraulic fluids from hydraulic line 57 to insure uniform loading of the assemblage 20. As the assemblage is loaded with dredged material, the draft of vessel 34 is trimmed by the filling of trimming tanks 46 and 47. In the event that dredging was continued during the connecting operation, dredging material in tank 46 and 47 may be removed in part or whole via the suction lines which leads from the bottoms of such tanks to the intake of at least one of the dredging pumps 42. However, this will normally not be necessary.

When the assemblage 20 has been filled, it is disconnected by closing valve 62 after having opened valve 61 if it is desired to continue dredging operations during this procedure. The hydraulic line 57 is then secured and disconnected, air is bled from chambers 91 and 92 of the stem fender 50 via valves 105 and the fender pieces 64 and 71 are deflated by bleeding, air conduit 52 having been disconnected. After assemblage 20 has been disconnected from the dredging vessel 34, a further assemblage can be connected to the dredging vessel as previously described and a prime mover vessel such as vessel 122 may then remove the assemblage to the location where removal of the dredged material is effected after which assemblage 20 may be returned to the dredging vessel for reconnection when the assemblage which it is to replace or another assemblage has been disconnected from the dredging vessel 34. Preferably, the prime mover vessel will include a bow portion similar to that of bow portion 35 of vessel 34. With same, the prime mover vessel becomes, in effect, integral with the assemblage which increases its efficiency and flexibility in transporting the assemblage.

It will be appreciated by those skilled in the art that instead of having the fender pieces 64 and the outboard fender pieces 71 connected to stern notch 25, they may be connected to either bow portion 24 or 35 and controlled directly from such unit. When a prime mover vessel has fender pieces 64 and 71 as indicated secured to its bow portion, it not only can be utilized to propel barge assemblies but also cargo barge assemblages having similar stern notch configuration. Moreover, it may be utilized for known tug boat operations wherein fender pieces such as 64 and 71 and a stern fender such as fender 50 may be required. Accordingly, the pneumatic type of securing means via a plurality of inflatable fenders permits a considerable amount of flexibility insofar as the utilization of the prime mover vessel is concerned. This potential for flexibility in the use of the prime mover vessel is of importance due to the fact that the number of prime mover vessels required in any given dredging operation will depend largely upon the distance to the disposal area — a parameter which will vary from operation to operation. Thus, a prime mover vessel in accordance with the invention can be utilized as tug or for pusher type cargo barge operations when it is not needed to function as part of the dredging, transport and disposal team.

Having described my invention, what I claim as new and desire to secure by Letters Patent of the U.S. is:

1. Apparatus for connecting conduits of adjacent vessels for the conveying of liquiform material which comprises:
   a first vessel and a second vessel;
   a notch in the stern of said second vessel adapted to receive the bow of said first vessel;
   means for substantially rigidly coupling said vessels together with said first vessel's bow received in the notch of said second vessel;
   a first conduit mounted at the bow of said first vessel;
   a second conduit mounted at the stern of said second vessel in a position for direct connection to said first conduit when said vessels are rigidly coupled together by said coupling means, the relationship of said vessels and said conduits being such that with said vessels trimmed whereby said conduits are at substantially the same level and with said vessels rigidly coupled together by said coupling means, one of said conduits is positioned whereby it is received by the other said conduit;
   an outlet conduit portion included in said one conduit and an inlet conduit portion included in said other conduit receiving said outlet conduit;
   pneumatic responsive means disposed between said inlet conduit portion and said outlet conduit portion receiving said inlet conduit portion, said responsive means comprising a pair of annular expansible members, the first surrounding said outlet conduit portion and the second surrounded by said inlet conduit portion, said first and second annular members located in their respective conduits so as to be in juxtaposition when said vessels are rigidly coupled together;
   a pressurized air supply in air flow communication with said annular members of said pneumatic responsive means which are thereby adapted to be expanded against each other by said pressurized air supply; and
   remote control means for selectively controlling the admission of pressurized air from said pressurized air supply to said pneumatic responsive means which is adapted selectively and rapidly to expand said pneumatic responsive means when said outlet conduit portion is received in said inlet conduit portion whereby said first and second conduits are rapidly connected in a substantially fluid-tight condition.

2. Apparatus in accordance with claim 1 wherein said outlet conduit portion is provided with a tolerance of at least about 12 inches in any radial direction from its center relative to said inlet conduit portion.

3. Apparatus in accordance with claim 1 wherein said outlet conduit portion has a diameter which is about one-half of the diameter of the entrance of said inlet conduit portion.

4. Apparatus in accordance with claim 1 wherein said control means are located in said vessel on which said outlet conduit means are mounted.

5. Apparatus in accordance with claim 1 wherein said coupling means comprises pneumatic connection means provided to effect said coupling between said vessels.

6. Apparatus in accordance with claim 5 wherein said pneumatic connection means comprises pneumatically expansible means mounted relative to one of said vessels whereupon with expansion of said pneumatically expansible means with said bow received in said notch, said bow is frictionally retained in said notch.

7. Apparatus in accordance with claim 6 wherein said pressurized air supply furnishes air under pressure both to said pneumatic responsive means and to said pneumatically expansive means.

8. Apparatus in accordance with claim 1 wherein said second annular inwardly expansible member includes at least two separate circular channels having passages for receiving air under pressure from said pressurized air supply.

9. Apparatus in accordance with claim 1 wherein said inlet conduit portion is a tubular steel member having an interior lining of resilient rubber-like material, said second annular member mounted on said lining.

10. Apparatus in accordance with claim 1 comprising limiting means associated with said conduit portions adapted to limit the distance said outlet conduit portion is received in said inlet conduit portion.

11. Apparatus in accordance with claim 10 wherein said limiting means comprises a flange member disposed on said outlet conduit portion which is adapted to engage the periphery of said inlet conduit portion.

12. Apparatus in accordance with claim 1 wherein said outlet conduit portion is composed of a rigidly reinforced rubber-like material and said inlet conduit portion comprises a tubular steel member.

* * * * *